US011176347B2

(12) United States Patent
Riehl et al.

(10) Patent No.: US 11,176,347 B2
(45) Date of Patent: Nov. 16, 2021

(54) FINGERPRINT-ON-DISPLAY RECOGNITION

(71) Applicant: Analog Devices International Unlimited Company, Limerick (IE)

(72) Inventors: Patrick Riehl, Lynnfield, MA (US); Gary Carreau, West Charleston, VT (US); Richard J. Capistran, Derry, NH (US); Kenneth M. Feen, Hospital (IE); Brian Jeffrey Wengreen, Ravensdale, WA (US)

(73) Assignee: ANALOG DEVICES INTERNATIONAL UNLIMITED COMPANY, Limerick (IE)

( * ) Notice: Subject to any disclaimer, the term of this patent is extended or adjusted under 35 U.S.C. 154(b) by 0 days.

(21) Appl. No.: 16/900,479

(22) Filed: Jun. 12, 2020

(65) Prior Publication Data
US 2020/0394378 A1    Dec. 17, 2020

Related U.S. Application Data

(60) Provisional application No. 62/861,690, filed on Jun. 14, 2019.

(51) Int. Cl.
*G06K 9/00* (2006.01)
*G06F 21/32* (2013.01)

(52) U.S. Cl.
CPC .......... *G06K 9/0004* (2013.01); *G06F 21/32* (2013.01); *G06K 9/00087* (2013.01); *G06K 2009/0006* (2013.01)

(58) Field of Classification Search
CPC ......... G06K 9/0004; G06K 2009/0006; G06K 9/00087; G06K 9/0008; G06F 21/32; G06F 3/0421; G02F 1/13338

USPC .......................................................... 382/124
See application file for complete search history.

(56) References Cited

U.S. PATENT DOCUMENTS

| | | | |
|---|---|---|---|
| 8,046,721 B2 | 10/2011 | Chaudhri et al. | |
| 8,904,479 B1 | 12/2014 | Johansson et al. | |
| 2003/0118218 A1* | 6/2003 | Wendt | G06K 9/0008 382/124 |
| 2008/0022613 A1 | 9/2008 | Gardner | |
| 2019/0102594 A1* | 4/2019 | Peng | G06K 9/00087 |
| 2019/0130083 A1* | 5/2019 | Agassy | G06K 9/00087 |

(Continued)

FOREIGN PATENT DOCUMENTS

| | | |
|---|---|---|
| KR | 2013-0030170 A | 3/2013 |
| KR | 2017-0025802 A | 3/2017 |
| WO | 2019/020106 A1 | 1/2019 |

OTHER PUBLICATIONS

English Patent Translate of WO 2019/020101 A1, 9 pages.
English Patent Translate of KR 10-2013-0030170 A, 15 pages.
English Patent Translate of KR 10-2017-0025802 A, 13 pages.

*Primary Examiner* — Abdul-Samad A Adediran
(74) *Attorney, Agent, or Firm* — Patent Capital Group

(57) ABSTRACT

Systems and methods described herein relate to fingerprint-on-display recognition. In particular, the systems and methods described herein may recognize a fingerprint when a finger of a user is placed on a display and authenticate the user based on the recognized fingerprint. Further, the embodiments described herein may utilize multiple colors and/or secondary factors to reduce erroneous authentications of the user. The approaches may improve the accuracy of fingerprint authentication by using the multiple colors and/or secondary factors.

21 Claims, 8 Drawing Sheets

(56) References Cited

U.S. PATENT DOCUMENTS

2019/0266376 A1\* 8/2019 He .................. G02F 1/13338
2021/0012080 A1\* 1/2021 Fan .................. G06F 3/0421

\* cited by examiner

Touch sequence

FINGERPRINT-ON-DISPLAY RECOGNITION

RELATED APPLICATIONS

The present disclosure claims priority to U.S. provisional application No. 62/861,690 entitled "FINGERPRINT-ON-DISPLAY RECOGNITION" and filed Jun. 14, 2019, the disclosure of which is incorporated by reference in its entirety.

FIELD OF THE DISCLOSURE

This disclosure relates in general to the field of computing, and more particularly, though not exclusively, to a system and method for fingerprint recognition on display.

BACKGROUND

Thin-film transistor (TFT) sensors for fingerprint-on-display (FoD) is presumed to be an array of monochromatic photodiodes in legacy approaches. A legacy approach for illuminating TFT sensors is to flash a white square on an organic light emitting diode (OLED) display.

BRIEF DESCRIPTION OF THE DRAWINGS

The present disclosure is best understood from the following detailed description when read with the accompanying figures. It is emphasized that, in accordance with the standard practice in the industry, various features are not necessarily drawn to scale, and are used for illustration purposes only. Where a scale is shown, explicitly or implicitly, it provides only one illustrative example. In other embodiments, the dimensions of the various features may be arbitrarily increased or reduced for clarity of discussion.

SUMMARY OF THE DISCLOSURE

Figure 1:
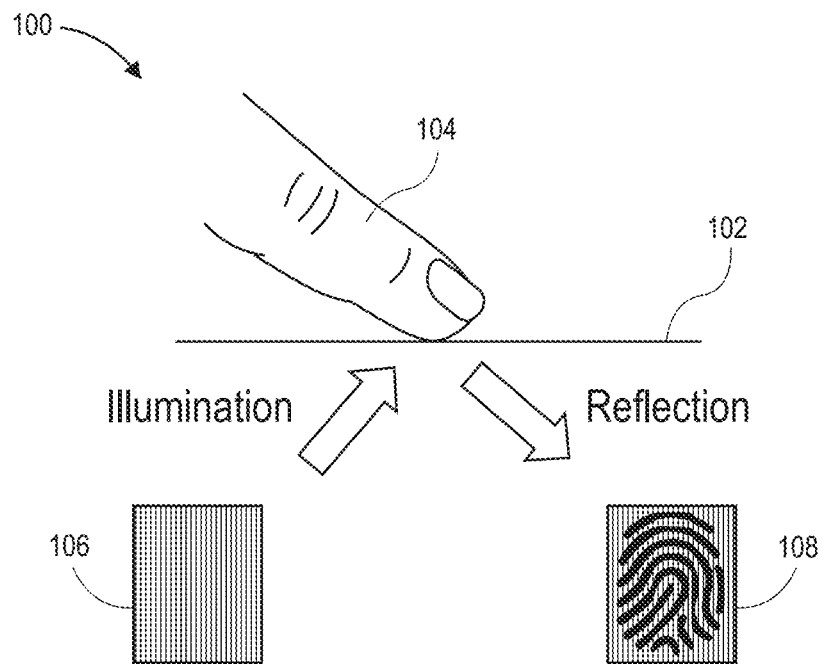
FIG. 1 illustrates an example fingerprint capture arrangement utilizing a red light region that may be implemented in a sequential exposure approach, according to various embodiments disclosed herein.

Systems and methods described herein relate to fingerprint-on-display recognition. In particular, the systems and methods described herein may recognize a fingerprint when a finger of a user is placed on a display and authenticate the user based on the recognized fingerprint. Further, the embodiments described herein may utilize multiple colors and/or secondary factors to reduce erroneous authentications of the user. The approaches may improve the accuracy of fingerprint authentication by using the multiple colors and/or secondary factors.

In some embodiments, one or more computer-readable media may have instructions stored thereon that can be executed by a system. The instructions, when executed by a system, may cause the system to emit a colored light to light a finger positioned on a display for fingerprint authentication and capture a fingerprint image of the finger produced based on the colored light. The instructions may further cause the system to compare the fingerprint image with a control fingerprint image to determine a result of the fingerprint authentication.

In some embodiments, a method for fingerprint authentication may include sensing a finger positioned on a display and applying a colored light to the finger. The method may further include capturing a fingerprint image based on the colored light reflected from the finger and comparing the fingerprint image with a control fingerprint image to authenticate the finger.

In some embodiments, a system to perform fingerprint authentication may include a display on which a finger is to be positioned for the fingerprint authentication and a light element to emit a colored light out of the display on the finger. The system may further include one or more sensors to detect the colored light reflected toward the display by the finger, and a readout integrated circuit (ROIC) to generate a fingerprint image based of the reflected colored light detected by the one or more sensors and determine whether to authenticate the finger based on a comparison of the fingerprint image with a control fingerprint image.

In some embodiments, a method for fingerprint authentication may include detecting a finger being positioned on a display and capturing a first fingerprint image of the finger in response to the detection of the finger being positioned on the display and a second fingerprint image of the finger, the second fingerprint image captured subsequent to the first fingerprint image. The method may further include determining whether a first portion of the finger represented by the first fingerprint image is different from a second portion of the finger represented by the second fingerprint image, and determining whether to authenticate the finger based on whether the first portion of the finger represented by the first fingerprint image is different from the second portion of the finger represented by the second fingerprint image.

In some embodiments, a method for fingerprint authentication may include detecting a position of a finger positioned against a display and determining whether a shadow is cast on the display adjacent to the position. The method may further include determining whether to authenticate the finger based on whether the shadow is cast on the display adjacent to the position.

DETAILED DESCRIPTION

The following disclosure provides many different embodiments, or examples, for implementing different features of the present disclosure. Specific examples of components and arrangements are described below to simplify the present disclosure. These are, of course, merely examples and are not intended to be limiting. Further, the present disclosure may repeat reference numerals and/or letters in the various examples, or in some cases across different figures. This repetition is for the purpose of simplicity and clarity and does not in itself dictate a specific relationship between the various embodiments and/or configurations discussed. Different embodiments may have different advantages, and no particular advantage is necessarily required of any embodiment.

System and methods for fingerprint-on-display (FoD) recognition will now be described with more particular reference to the attached FIGURES. It should be noted that throughout the FIGURES, certain reference numerals may be repeated to indicate that a particular device or block is wholly or substantially consistent across the FIGURES. This is not, however, intended to imply any particular relationship between the various embodiments disclosed. In certain examples, a genus of elements may be referred to by a particular reference numeral ("widget 10"), while individual species or examples of the genus may be referred to by a hyphenated numeral ("first specific widget 10-1" and "second specific widget 10-2").

Legacy approaches to recognition and authentication of a fingerprint-on-display presumed an array of monochromatic photodiodes. The legacy approaches would flash a white square on an organic light emitting diode (OLED) display to illuminate a thin-film transistor (TFT) sensor to recognize a fingerprint of a finger positioned on the display and authenticate a user based on the recognized fingerprint. However, it is possible to trick the legacy system into erroneous authentications, such as by placing a picture of a fingerprint on the screen rather than a finger of the user.

The systems and methods described herein may reduce the possibility for erroneous authentications due to the systems being tricked. In particular, the systems and methods may utilize multiple colors being flashed and/or secondary factors (such as shadows cast on the display and/or motion detection) in the recognition of fingerprints and authentication of users that can reduce the opportunity for tricking the systems into erroneous authentications, such as by placing a picture of a fingerprint on the display. Accordingly, the systems and methods described herein may add additional security and/or ease requirements on a readout integrated circuit (ROIC) as compared to legacy approaches.

The systems and methods described herein may be implemented via a display. For example, the systems and methods may be implemented via an OLED display in some embodiments, where the OLED display includes a high-resolution and high-performance red-blue-green (RGB) light source. In other embodiments, the systems and methods may be implemented via an electroluminescent (ELD) display, a liquid crystal display (LCD), a light emitting diode (LED) display, an active matrix organic light emitting diode (AMOLED) display, a plasma display, or a quantum dot light emitting diode (QLED) display.

RGB Exposure

A sequential exposure of colored lights, such as red, green and blue, on a display (such as an OLED display), can produce a color image of a fingerprint in some embodiments. As used herein, the term colored light may refer to a nonwhite color of light. For these embodiments, a TFT sensor can be sensitive over the full spectrum of visible light. Using this approach, security could be enhanced due to the fact that fingerprint data that could be lifted from fingerprint residue or conventional fingerprint scanners is monochrome. Furthermore, the sensitivity of the measurement could be enhanced because ambient light collected by the sensor would be common to all three of the RGB images. In post-processing, the average signal of all three images could be subtracted out. The remaining image data would reflect only the differences in reflectivity between red, green and blue illumination on the fingerprint.

Figure 2:
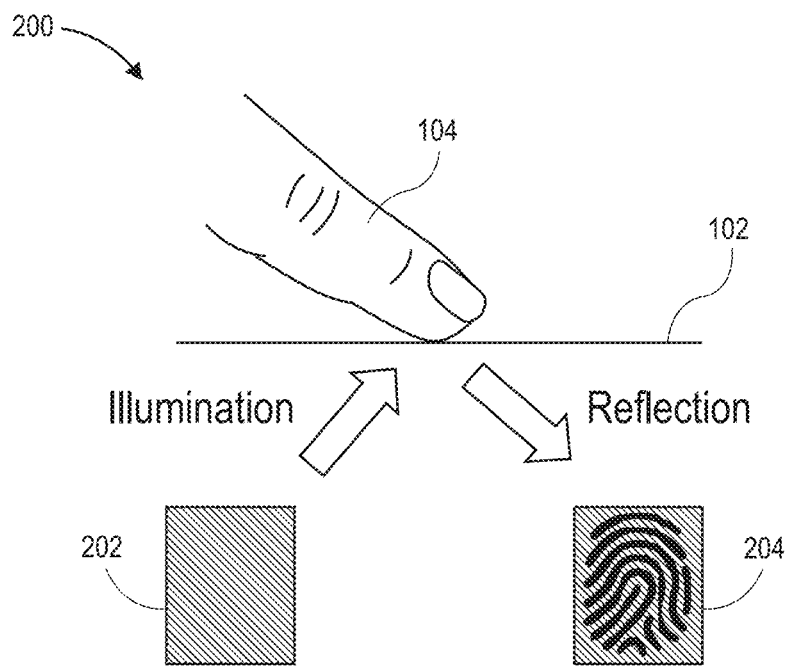
FIG. 2 illustrates an example fingerprint capture arrangement utilizing a green light region that may be implemented in a sequential exposure approach, according to various embodiments disclosed herein.
Figure 3:
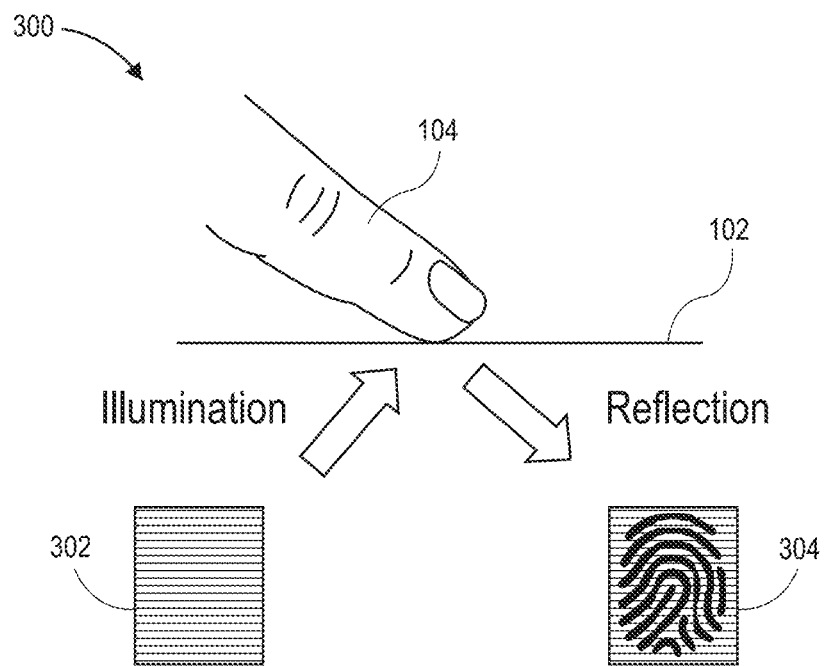
FIG. 3 illustrates an example fingerprint capture arrangement utilizing a blue light region that may be implemented in a sequential exposure approach, according to various embodiments disclosed herein.

FIGS. 1 through 3 are illustrations of example fingerprint capture arrangements of a sequential exposure approach, according to various embodiments disclosed herein. FIG. 1 illustrates an example fingerprint capture arrangement 100 utilizing a red light region that may be implemented in a sequential exposure approach, according to various embodiments disclosed herein. The fingerprint capture arrangement 100 includes a display 102. A finger 104 of a user is placed on the display 102. While the finger 104 is placed on the display 102, the display 102 may emit a red light region 106 (the red color indicated by vertical line fill). The display 102 may capture light from the red light region 106 reflected off the finger 104, thereby producing a fingerprint capture 108 of a fingerprint of the finger 104. In some embodiments, the display 102 may perform a monochromatic capture of the light from the red light region 106 reflected off the finger 104 to produce the fingerprint capture 108, where the fingerprint capture 108 may be monochromatic. In these embodiments, the display 102 may comprise a monochrome image sensor, where the monochrome image sensor may detect a specific color or specific colors to produce a monochrome fingerprint.

FIG. 2 illustrates an example fingerprint capture arrangement 200 utilizing a green light region that may be implemented in a sequential exposure approach, according to various embodiments disclosed herein. The fingerprint capture arrangement 200 includes the display 102. The finger 104 of the user is placed on the display 102. While the finger 104 is placed on the display 102, the display 102 may emit a green light region 202 (the green color indicated by diagonal line fill). The display 102 may capture light from the green light region 202 reflected off the finger 104, thereby producing a fingerprint capture 204 of the fingerprint of the finger 104. In some embodiments, the display 102 may perform a monochromatic capture of the light from the green light region 202 reflected off the finger 104 to produce the fingerprint capture 204, where the fingerprint capture 204 may be monochromatic. In these embodiments, the display 102 may comprise a monochrome image sensor, where the monochrome image sensor may detect a specific color or specific colors to produce a monochrome fingerprint.

FIG. 3 illustrates an example fingerprint capture arrangement 300 utilizing a blue light region that may be implemented in a sequential exposure approach, according to various embodiments disclosed herein. The fingerprint capture arrangement 300 includes the display 102. The finger 104 of the user is placed on the display 102. While the finger 104 is placed on the display 102, the display 102 may emit a blue light region 302 (the blue color indicated by horizontal line fill). The display 102 may capture light from the blue light region 302 reflected off the finger 104, thereby producing a fingerprint capture 304 of the fingerprint of the finger 104. In some embodiments, the display 102 may perform a monochromatic capture of the light from the blue light region 302 reflected off the finger 104 to produce the fingerprint capture 304, where the fingerprint capture 304 may be monochromatic. In these embodiments, the display 102 may comprise a monochrome image sensor, where the monochrome image sensor may detect a specific color or specific colors to produce a monochrome fingerprint.

A sequential exposure approach for capturing fingerprints and authentication may include sequentially, in time, implementing the fingerprint capture arrangement 100, the fingerprint capture arrangement 200, and the fingerprint capture arrangement 300 (collectively referred to herein as "colored fingerprint capture arrangements"). In particular, the sequential exposure approach may include implementing a first of the colored fingerprint capture arrangements, followed by a second of the colored fingerprint capture arrangements, and followed by a third of the colored fingerprint capture arrangements. The colored fingerprint capture arrangements may be implemented in any order. Further, other or additional fingerprint capture arrangements may be implemented in other embodiments, where the other or additional fingerprint capture arrangements may emit light regions of colors other than red, green, and blue. The fingerprint capture 108, the fingerprint capture 204, and the fingerprint capture 304 (collectively referred to herein as "colored fingerprint captures") may be captured and stored during the corresponding colored fingerprint capture arrangements. In embodiments where other or additional fingerprint capture arrangements are implemented with light regions of other colors, fingerprint captures corresponding to the other or additional fingerprint capture arrangements may be captured and stored as part of the colored fingerprint captures.

Each of the colored fingerprint captures may be analyzed, and compared to a control fingerprint image and to each other to authenticate the user, where the control fingerprint image may have been previously captured and stored as an authenticated fingerprint image corresponding to a particular user. For example, each of the colored fingerprint captures may be compared to the control fingerprint image to determine that the colored fingerprint captures substantially match (i.e., either exactly match or match within a predefined difference measurement range) the control fingerprint image to verify that a same fingerprint has been captured by the colored fingerprint captures and the control fingerprint image. Further, each of the colored fingerprint captures may be compared to each other to identify differences in reflectivity of the different colored lights that indicate the fingerprint captured has been captured directly from the finger 104 (which may be referred to as liveness detection) rather than a reproduction of the finger 104 (such as a photograph or an image of the finger 104). In particular, different colors of light may reflect of the finger 104 differently (i.e., at different angles and/or at different intensities), whereas the same differences may not be present when the fingerprint has been captured from a reproduction of the finger 104. Based on a determination that the captured fingerprint substantially matches the control fingerprint image and that the reflectivity of the different colored lights indicate that the fingerprint has been captured directly from the finger 104, the user may be authenticated based on the captured fingerprint.

In some other embodiments, an alternative to sequential samples would be to subdivide the imaging region into red, green and, blue regions. The full image could be used for fingerprint matching while the differences between the red, green, and blue regions could be used for liveness detection.

Figure 4:
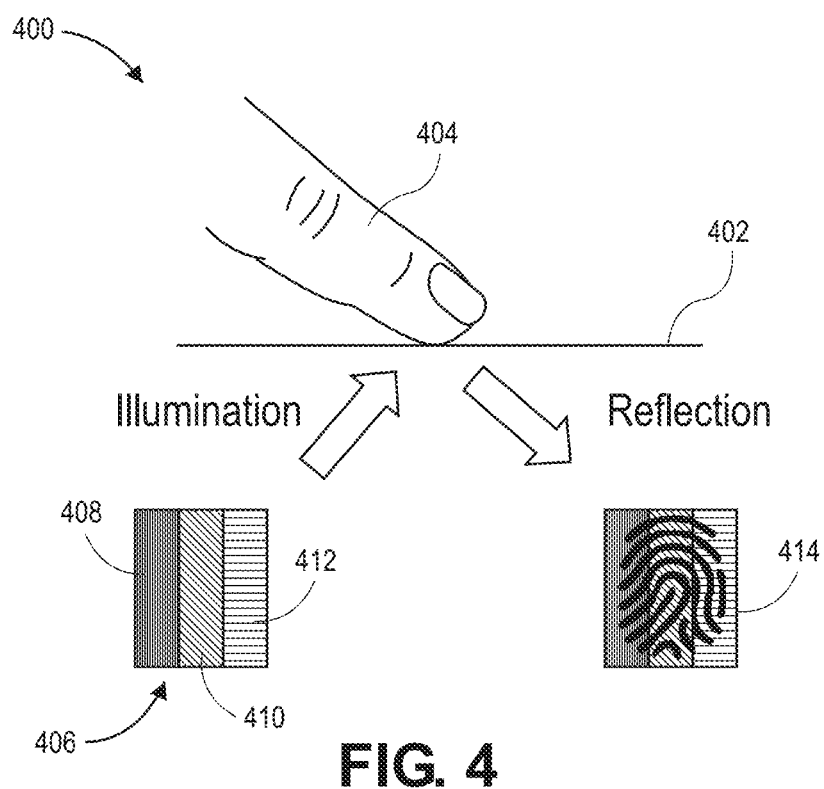
FIG. 4 illustrates an example fingerprint capture arrangement utilizing a multicolored region, according to various embodiments disclosed herein.

FIG. 4 illustrates an example fingerprint capture arrangement 400 utilizing a multicolored region, according to various embodiments disclosed herein. The fingerprint capture arrangement 400 includes the display 402. The finger 404 of the user is placed on the display 402. While the finger 404 is placed on the display 402, the display 402 may emit a multicolored light region 406. For example, the multicolored light region 406 includes a red light region 408 (the red color indicated by vertical line fill), a green light region 410 (the green color indicated by diagonal line fill), and a blue light region 412 (the blue color indicated by horizontal line fill). In other embodiments, the multicolored light region 406 may include two or more regions of different colored lights and/or different colors of light than shown in the illustrated embodiment. The display 402 may capture light from the multicolored light region 406 reflected off the finger 404, thereby producing a multicolored fingerprint capture 414 of the fingerprint of the finger 404. In some embodiments, the display 402 may perform a monochromatic capture of the light from the multicolored light region 406 reflected off the finger 404 to produce the multicolored fingerprint capture 414, where the multicolored fingerprint capture 414 may be monochromatic. In these embodiments, the display 402 may comprise a monochrome image sensor, where the monochrome image sensor may detect a specific color or specific colors to produce a monochrome fingerprint.

The multicolored fingerprint capture 414 may be analyzed, and compared to a control fingerprint image to authenticate the user, where the control fingerprint image may have been previously captured utilizing the multicolored light region 406 and stored as an authenticated fingerprint image corresponding to a particular user. For example, the multicolored fingerprint capture 414 may be compared to the control fingerprint image to determine that the multicolored fingerprint capture 414 substantially matches (i.e., either exactly matches or matches within a predefined difference measurement range) the control fingerprint image to verify that a same fingerprint has been captured by the multicolored fingerprint capture 414 and the control fingerprint image. As both the multicolored fingerprint capture 414 and the control fingerprint image had been captured utilizing the multicolored light region 406, both the multicolored fingerprint capture 414 and the control fingerprint image will have differences in reflectivity of the different colored lights that indicate the fingerprint was captured directly from the finger 404. Based on a determination that the captured fingerprint substantially matches the control fingerprint image, the user may be authenticated.

Color-Tuned Exposure

Rather than illuminating the finger with a white square or an RGB sequence, a specific color could be used in a single exposure. This could have some potential advantages for the performance of the measurement system as compared to legacy approaches. If the TFT sensor is only sensitive in a narrow color band, it could be that illuminating with other colors wastes power, so this procedure could be used to reduce overall energy consumption. It could also be the case that the fingerprint image has more contrast in some color bands than others. Illuminating with only the higher-contrast colors could improve the relative contrast of the final image.

The color tuning could be performed during the training sequence, when multiple fingerprint images are being taken. The illumination color could also be optimized for the skin tone of the user.

Figure 5:
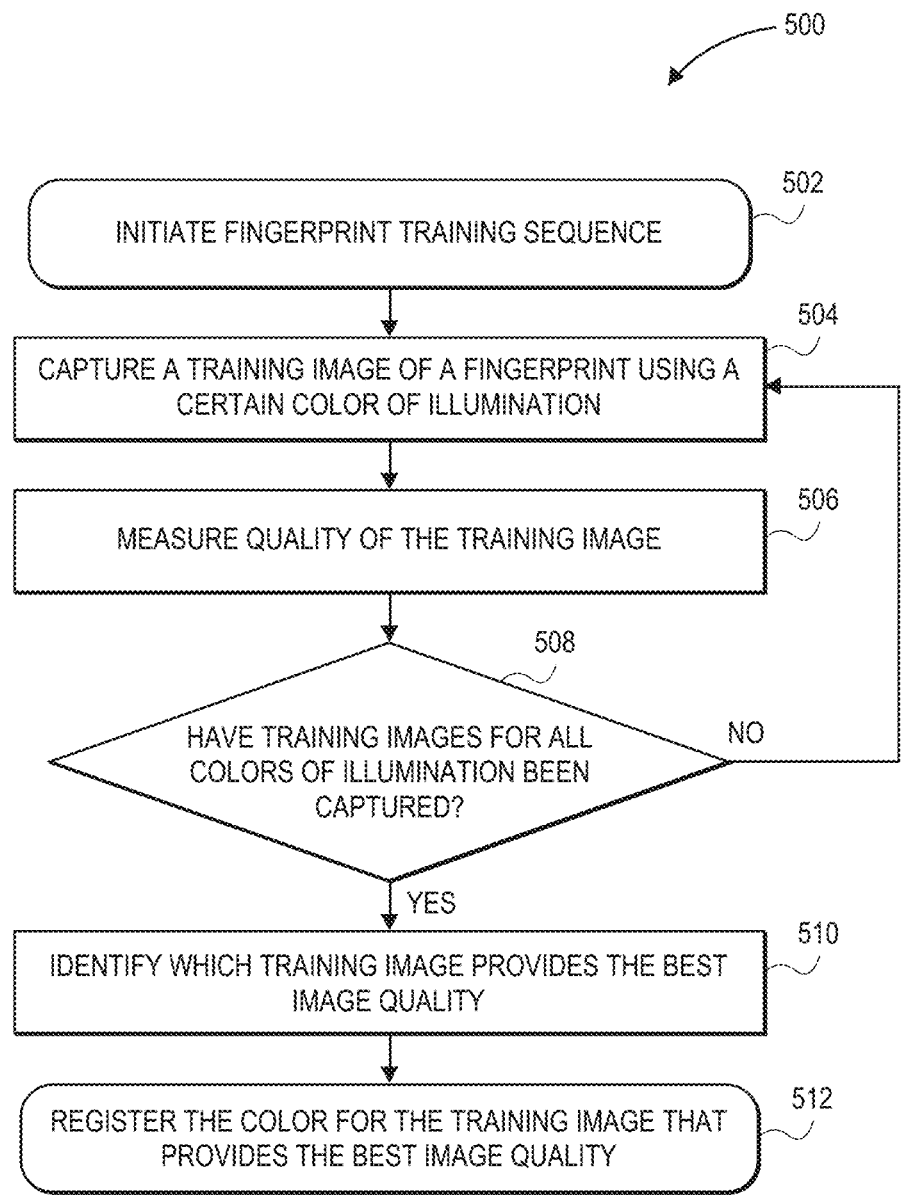
FIG. 5 illustrates an example fingerprint training procedure, according to various embodiments disclosed herein.

FIG. 5 illustrates an example fingerprint training procedure 500, according to various embodiments disclosed herein. The fingerprint training procedure 500 may comprise, or may be part of, a training sequence. The fingerprint training procedure 500 may determine an optimal illumination color for a user for capture of a fingerprint of the user and authentication of the user based on the fingerprint.

The procedure 500 initiates in 502. In particular, the procedure 500 may enter 502 in response to detecting an indication that a fingerprint training sequence should be initiated. In some embodiments, the indication may be generated in response to a new user being registered with the system implementing the procedure 500 and/or a user request for registering a fingerprint corresponding to the user for authentication. In 502, a fingerprint training sequence may be initiated. The procedure 500 may proceed from 502 to 504.

In 504, a training image of a fingerprint may be captured by a system implementing the procedure 500 using a certain color of illumination. The color of illumination may be a first color in a group of colors that are being tested to determine an optimal color of illumination for the user. To capture the training image, the system may implement a fingerprint capture arrangement (such as the fingerprint capture arrangement 100 (FIG. 1), the fingerprint capture arrangement 200 (FIG. 2), and/or the fingerprint capture arrangement 300 (FIG. 3)) utilizing the first color in the group of colors as the color of the emitted light region being emitted from the display. The system may further capture a fingerprint capture (such as the fingerprint capture 108 (FIG. 1), the fingerprint capture 204 (FIG. 2), and/or the fingerprint capture 304 (FIG. 3)) of the fingerprint of the user from the reflected light of the emitted color of light. In some embodiments, the system may be configured to detect only the reflected light of the color that was emitted from the display for generating the fingerprint capture, such as by filtering the other colors of light received by the display or not detecting the other colors of light. The fingerprint capture may be stored as the training image corresponding to the color emitted. The procedure 500 may proceed from 504 to 506.

In 506, a quality of the training image captured in 504 may be measured. For example, the training image may be analyzed and characteristics (such as contrast) of the training image that can affect the ability to authenticate the user may be rated based on whether, and possibly how much, the characteristics assist in proper authentication of the user based on the fingerprint captured in the training image. In some embodiments, the ratings of the characteristics may be utilized for generating an overall rating of the training image, where the ratings of the characteristics may be weighted in some embodiments for generating the overall rating. The procedure 500 may proceed from 506 to 508.

In 508, it may be determined whether training images for all colors of illumination have been captured. In particular, it may be determined whether training images corresponding to all the colors within the group of colors that are being tested to determine an optimal color of illumination for the user have been stored. If it is determined that training images corresponding to all the colors have not been stored, the procedure 500 may return to 504 and repeat 504 and 506 for a color within the group of colors that does not have a corresponding training image stored. If it is determined that training images corresponding to all the colors have been stored, the procedure 500 may proceed to 510.

In 510, a training image, from the captured training images corresponding to the colors, that provides a best image quality may be identified. In embodiments where the characteristics of the training images have been rated and/or an overall rating has been generated for the captured training images, the ratings may be utilized for identifying a training image that provides the best image quality. For example, the training image with the highest ratings and/or overall rating may be determined to be the training image that provides the best image quality. The procedure 500 may proceed from 510 to 512.

In 512, the color corresponding to the training image with the best image quality is registered as the optimal color for the user. For example, an indication of the color may be stored indicating that the color should be utilized for fingerprint authentication of the user.

Figure 6:
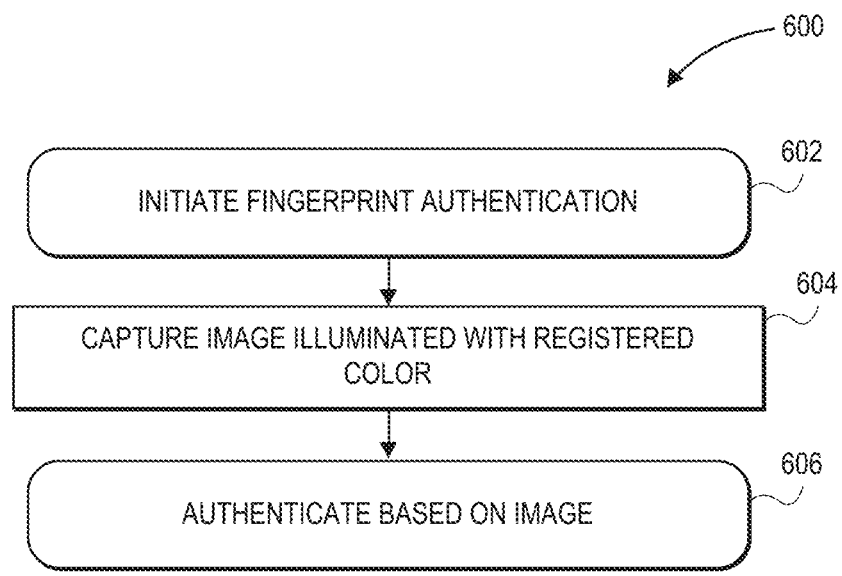
FIG. 6 illustrates an example fingerprint authentication procedure, according to various embodiments disclosed herein.

FIG. 6 illustrates an example fingerprint authentication procedure 600, according to various embodiments disclosed herein. The fingerprint authentication procedure 600 may be utilized for authenticating the user based on a captured fingerprint of the user.

Procedure 600 may initiate in 602, where fingerprint authentication is initiated. In some embodiments, the fingerprint authentication may be initiated in response to detecting an indication for initiation of fingerprint authentication, where the indication may be generated in response to a user trying to access the system. The procedure 600 may proceed from 602 to 604.

In 604, an image may be captured with the registered color. For example, a fingerprint capture arrangement (such as the fingerprint capture arrangement 100 (FIG. 1), the fingerprint capture arrangement 200 (FIG. 2), and/or the fingerprint capture arrangement 300 (FIG. 3)) may be implemented, where the color registered for the user by the procedure 500 (FIG. 5) is emitted as the light region from the display and a fingerprint capture (such as the fingerprint capture 108 (FIG. 1), the fingerprint capture 204 (FIG. 2), and/or the fingerprint capture 304 (FIG. 3)) is captured with the reflected light from the colored light emitted. In some embodiments, the light received by the display that is captured for the fingerprint capture may be limited light of the registered color. By only capturing the light of the registered color (i.e., a color band of light corresponding to the registered color), the overall energy consumption may be reduced as compared to legacy fingerprint authentication approaches. The procedure 600 may proceed from 604 to 606.

In 606, the user may be authenticated based on the captured image. For example, the fingerprint captured in the image may be compared to a fingerprint captured in a control fingerprint image, where the control fingerprint image may have been previously captured (such as the image captured in procedure 500) and stored as an authenticated fingerprint image corresponding to a particular user. The user may be authenticated based on the fingerprint captured in the image substantially matching (i.e., either exactly matching or matching within a predefined difference measurement range) with the fingerprint captured in the control fingerprint image.

Multi-Finger, Dexterity Tests

With the full screen available to image fingerprints, the authentication protocol could be enhanced to include multiple fingers at once, or ask the user to perform actions which might be natural for real fingers, but difficult for manipulating false finger replicas. For example, the user could be asked to swipe in a certain direction, press at a randomly indicated location or draw a figure on the screen. The fingerprint could be imaged at various points during the process to verify the combination of correct fingerprint and correct user action.

Figure 7:
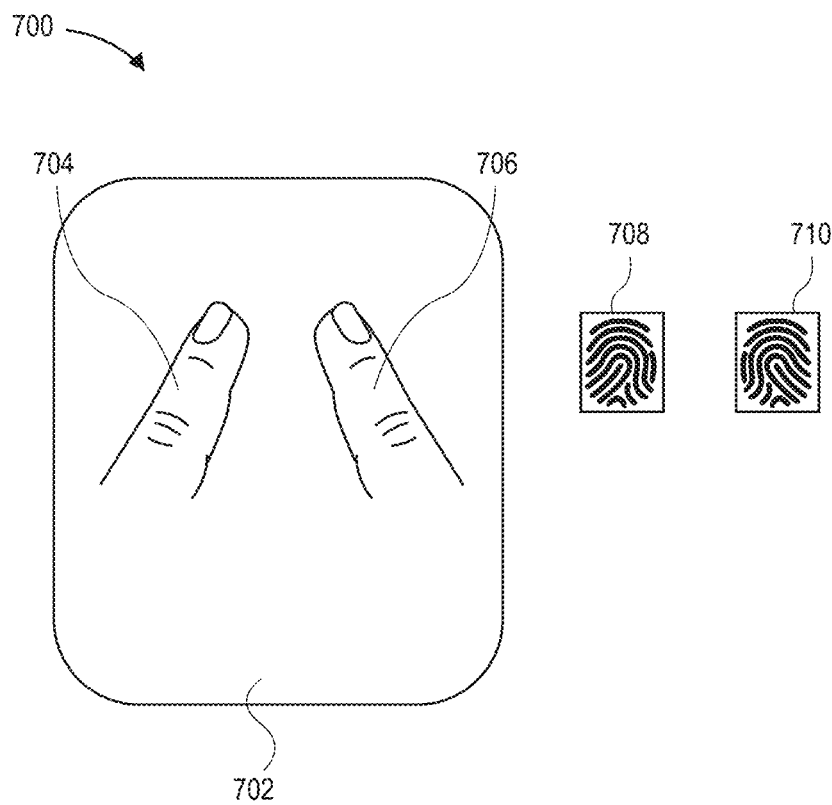
FIG. 7 illustrates an example multi-finger fingerprint capture arrangement, according to various embodiments disclosed herein.

FIG. 7 illustrates an example multi-finger fingerprint capture arrangement 700, according to various embodiments disclosed herein. For example, the multi-finger fingerprint capture arrangement 700 may authenticate the user by utilizing fingerprint captures for more than one finger of the user.

The multi-finger fingerprint capture arrangement 700 includes a display 702. Further, a first finger 704 and a second finger 706 of the user are placed on the display 702 in the illustrated embodiment. A light may be emitted from the display 702 and reflected light of the light emitted may be detected to produce fingerprint captures for each of the fingers. For example, a first finger capture 708 is captured that captures a fingerprint of the first finger 704 and a second finger capture 710 is captured that captures a fingerprint of the second finger 706 in the illustrated embodiment. The fingerprint captured in the first finger capture 708 may be compared with a fingerprint captured in a first control fingerprint capture corresponding to the first finger 704 and the fingerprint captured in the second finger capture 710 may be compared with a fingerprint captured in a second control fingerprint capture. The user may be determined to be authenticated based on the fingerprint of the first finger capture 708 substantially matching (i.e., either exactly matching or matching within a predefined difference measurement range) the fingerprint in the first control fingerprint capture and the fingerprint of the second finger capture 710 substantially matching (i.e., either exactly matching or matching within a predefined difference measurement range) the fingerprint in the second control fingerprint capture. In other embodiments, the multi-finger fingerprint capture arrangement 700 may be implemented with more than two fingers, and the fingers may be located on a same hand of the user or different hands of the user.

Figure 8:
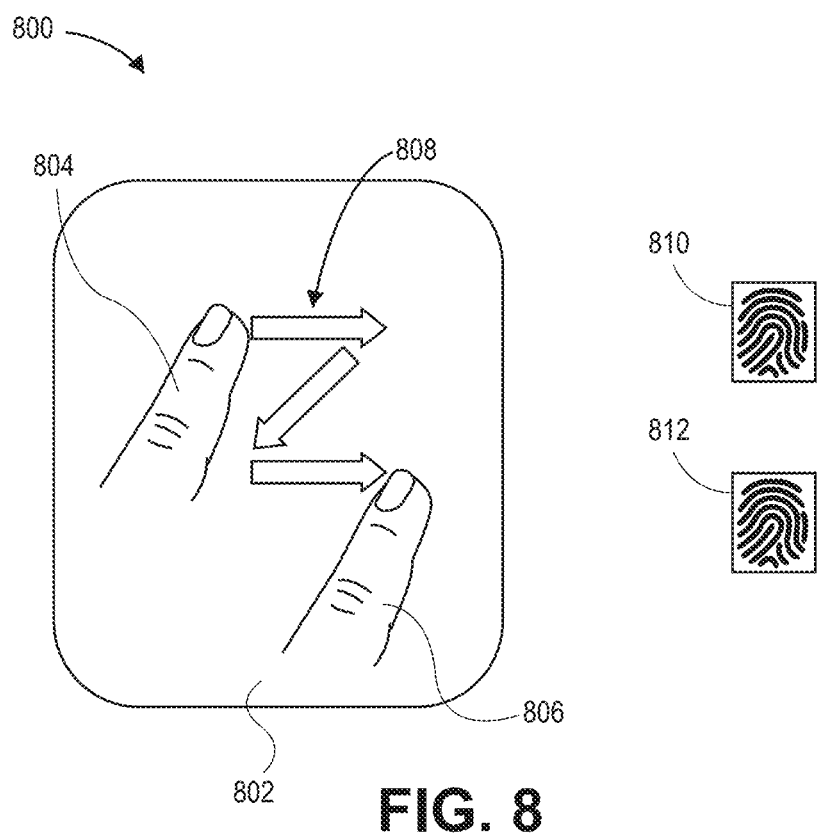
FIG. 8 illustrates an example action fingerprint capture arrangement, according to various embodiments disclosed herein.

FIG. 8 illustrates an example action fingerprint capture arrangement 800, according to various embodiments disclosed herein. For example, the action fingerprint capture arrangement 800 may authenticate the user by utilizing fingerprint captures as the finger is moved across the display and/or verifying the pattern of the finger as it is moved across the display.

The action fingerprint capture arrangement 800 may include a display 802. A finger of a user may be placed on the display 802 and may be moved along the display 802 from a first position, indicated by first finger representation 804, to a second position, indicated by second finger representation 806. The finger may be moved along a pattern, indicated by arrows 808. For example, the pattern is a Z-shape in the illustrated embodiment. A system implementing the action fingerprint capture arrangement 800 may indicate the pattern to be performed, such as be playing audio that indicates the pattern or displaying images (such as arrows) on the display 802 that indicate the pattern. Fingerprint captures of the finger may be captured at positions along the pattern as the finger is moved across the display 802. In the illustrated embodiment, a first fingerprint capture 810 may be captured when the finger is located at the first position, indicated by the first finger representation 804, and a second fingerprint capture 812 may be captured when the finger is located at the second position, indicated by the second finger representation 806. The first fingerprint capture 810 may capture a fingerprint of the finger when the finger is located in the first position and the second fingerprint capture 812 may capture the fingerprint of the finger when the finger is located in the second position.

The fingerprint captured by the first fingerprint capture 810 and the fingerprint captured by the second fingerprint capture 812 may be compared to a fingerprint captured by a control fingerprint image corresponding to the user, where the control fingerprint image may have been previously captured and stored as an authenticated fingerprint image corresponding to the user. Based on the fingerprint of the first fingerprint capture 810 and the fingerprint of the second fingerprint capture 812 substantially matching (i.e., either exactly matching or matching within a predefined difference measurement range) the fingerprint of the control fingerprint image, the user may be determined to be authenticated. In some embodiments, the pattern performed by the finger may be compared with the instructed pattern to determine whether the performed pattern substantially matches (i.e., either exactly matches or matches within a predefined error range) the instructed pattern. In these embodiments, the authentication of the user may include determining that the performed pattern substantially matches the instructed pattern in addition to determining that the fingerprints of the first fingerprint capture 810 and the second fingerprint capture 812 substantially matches the fingerprint of the control fingerprint image to determine that the user is authenticated. While a certain pattern and a certain number and positions of the fingerprint captures are described, it is to be understood that other patterns may be performed in other instances and/or the number and positions of the fingerprint captures may be different in other instances.

Imaging as Finger Pressure Varies

As the user presses a finger on the screen, the finger pressure varies from zero to some maximum force and back to zero. As this happens, the area of the fingerprint that makes contact with the screen will also increase to a maximum and decrease to zero. If multiple images can be taken during this sequence, it could help to differentiate between a real finger and a 2D image or 3D-printed mockup.

Figure 9:
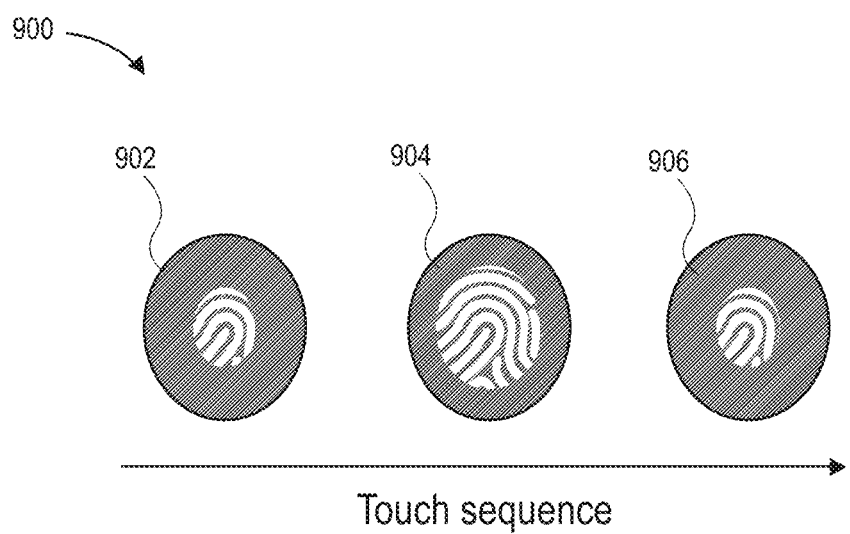
FIG. 9 illustrates an example touch sequence capture representation, according to various embodiments disclosed herein.

FIG. 9 illustrates an example touch sequence capture representation 900, according to various embodiments disclosed herein. In particular, the touch sequence capture representation 900 illustrates fingerprint captures that may be captured as a finger of a user is placed on and removed from the display. Each of the fingerprint captures may be captured by emitting a light from the display and detecting light, of the emitted light, being reflected to the display to generate the fingerprint captures.

The touch sequence capture representation 900 includes a first fingerprint capture 902. The first fingerprint capture 902 may be captured as a finger of the user is being placed on the display. At the time of the first fingerprint capture 902, an amount of pressure being applied by the finger causes only a first portion of a finger to contact the display, resulting in a first portion of a fingerprint of the finger being captured by the first fingerprint capture 902.

The touch sequence capture representation 900 further includes a second fingerprint capture 904. The second fingerprint capture 904 may be captured with the finger of the user placed on the display. At the time of the second fingerprint capture 904, an amount of pressure being applied by the finger is greater than the amount of pressure being applied during the first fingerprint capture 902 and causes a second portion of a finger to contact the display, resulting in a first portion and a second portion of the fingerprint of the finger being captured by the second fingerprint capture 904. In particular, the second portion of the fingerprint may be a ring of the fingerprint that surrounds the first portion of the fingerprint in the illustrated embodiment, where the additional pressure causes the portion of the finger corresponding to the ring to contact the display.

The touch sequence capture representation 900 further includes a third fingerprint capture 906. The third fingerprint capture 906 may be captured as a finger of the user is being removed from the display. At the time of the third fingerprint capture 906, an amount of pressure being applied by the finger is decreased from the time of the second fingerprint capture 904, where the reduced amount of pressure causes the second portion of the finger to be out of contact with the display only the first portion of a finger to contact the display, resulting in the first portion of the fingerprint of the finger being captured by the third fingerprint capture 906. In other embodiments, the amount of pressure being applied during the third fingerprint capture 906 may be less than or greater than illustrated, where less or more of the finger may contact the display and less or more of the fingerprint may be captured in the third fingerprint capture 906.

To authenticate the user, the portions of the fingerprint captured in the first fingerprint capture 902, the second fingerprint capture 904, and the third fingerprint capture 906 may be compared with corresponding portions of a fingerprint captured in a control fingerprint image, where the control fingerprint image may have been previously captured and stored as an authenticated fingerprint image corresponding to the user. Whether the portions of the fingerprint captured in the fingerprint captures substantially match (i.e., either exactly match or match within a predefined difference measurement range) the corresponding fingerprint of the control fingerprint image may be determined from the comparison. Further, the portions of the fingerprint captured in the first fingerprint capture 902, the second fingerprint capture 904, and the third fingerprint capture 906 may be compared to each other to determine whether different portions of the fingerprint are captured in at least two of the fingerprint captures, which indicates that different portions of the finger contact display as pressure is varied and indicates that the fingerprints captured have been captured directly from the finger (which may be referred to as liveness detection) rather than a reproduction of the finger (such as a photograph or an image of the finger). The user may be authenticated based on both the portions of the fingerprint captured in fingerprint captures substantially matching the corresponding fingerprint of the control fingerprint image and determination that different portions of the fingerprint are captured in at least two of the fingerprint captures.

In some embodiments, authenticating the user may further include determining whether the additional portions of the finger contacting the display, and/or the portions of the finger being removed from the display between contiguous fingerprint captures are the expected portions to be added or removed. For example, if additional pressure is applied by the finger, the additional portions of the finger that are expected to contact the display in a fingerprint capture may be contiguous to the portion contacting the display in a prior fingerprint capture. If the portion added is noncontiguous with (i.e. separate from) the portion contacting the display in the prior fingerprint capture, it can indicate that the fingerprint captures had not been captured directly from the finger of the user and the user may not be authenticated based on the portion being noncontiguous. The same contiguous analysis may be performed for portions of the finger being removed from the display. Further, in some embodiments the user may be instructed to perform a certain action (such as rolling their fingertip across the display in a particular direction) that results in additional portions of their finger contacting the display and/or portions of their finger being removed from contact with the display, where the additional portions and/or the portions being removed may be determined whether they are expected portions as part of the authentication process. Additionally, a series of control fingerprint images may have been previously captured with the certain action being performed, where comparison of the control fingerprint images could be used for determining which portions of the finger were expected to additionally contact the display and/or be removed from the display as the action was being performed, and indications of the additional portions of the finger and/or the portions of the finger being removed may be stored with indications of at what point during the action the additional portions of the finger would appear or the portion of finger would be removed. The indications may be utilized for determining whether the fingerprint captures of a touch sequence capture representation progress as expected for determining authentication of the user.

Use of Background Artifacts

The finger casts a shadow on the image sensor that is noticeable in the image. This feature could be used to discern between a real finger and a mockup. For this approach, a larger area than a location where a fingertip of the user is to be positioned may be imaged to capture the shadow, where the additional area may be captured with reduced resolution in some embodiments.

Figure 10:
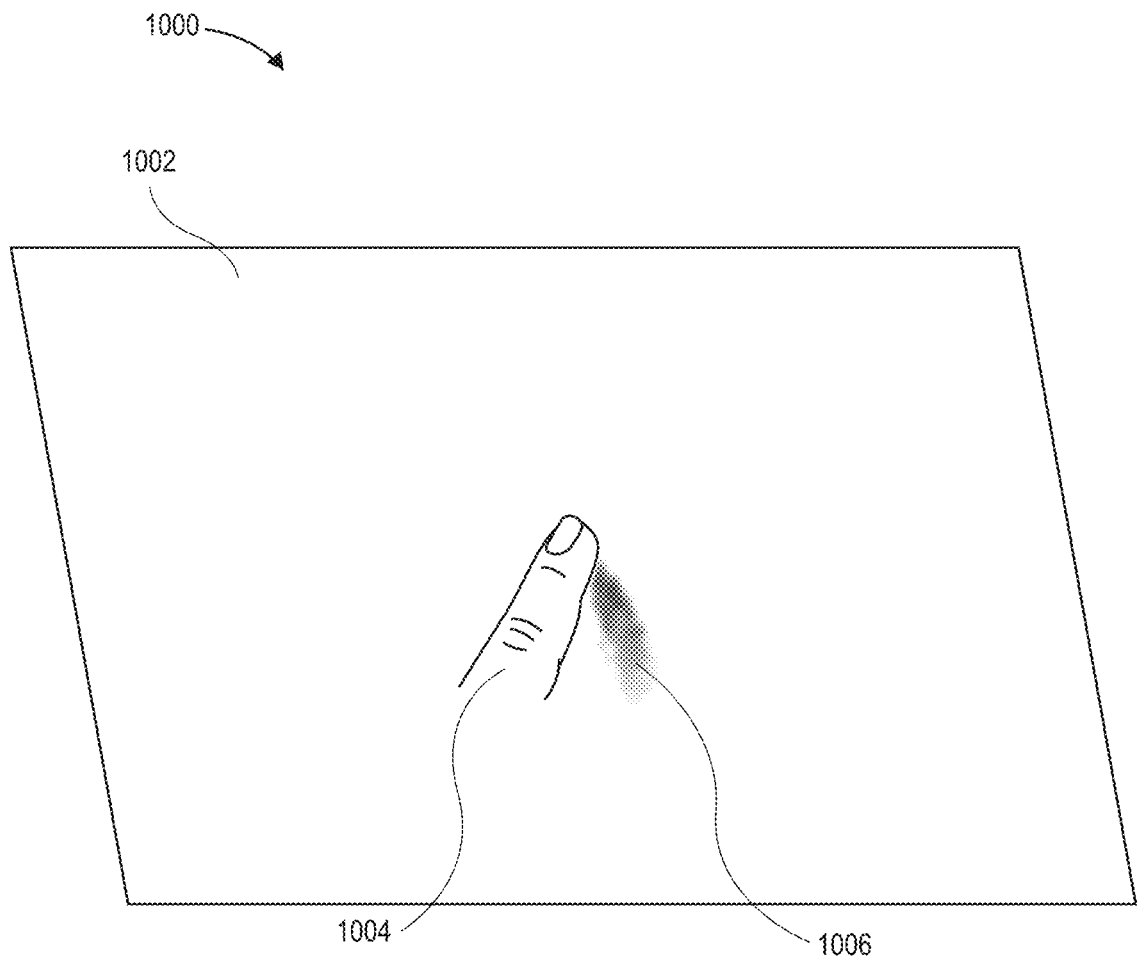
FIG. 10 illustrates an example touch and background artifact capture arrangement, according to various embodiments disclosed herein.

FIG. 10 illustrates an example touch and background artifact capture arrangement 1000, according to various embodiments disclosed herein. The artifact capture arrangement 1000 may be utilized for authenticating the user based on a captured fingerprint and detection of a shadow produced by a finger of the user.

The artifact capture arrangement 1000 includes a display 1002. A finger 1004 of the user may be placed on the display 1002. The display 1002 may emit a light and detect light, of the light being emitted, reflected back to the display 1002 to produce a fingerprint capture that captures a fingerprint of the finger, in accordance with any of the fingerprint capture arrangements described herein. The captured fingerprint may be compared to a fingerprint captured in a control fingerprint image as part of the authentication of the user. The artifact capture arrangement 1000 may further include a shadow 1006 caused by the finger 1004 that appears on the display 1002. The shadow 1006 may be generated by the finger 1004 keeping ambient light, or some portion thereof, from contacting the display 1002 in the area of the shadow 1006. The display 1002 may detect the lack, or reduction as compared to other portions of the display 1002, of the ambient light in the area of the shadow 1006 and may identify the shadow 1006 being cast by the finger 1004 based on the lack, or reduction, of the ambient light and the location of the shadow 1006 being near the position of the captured fingerprint. The user may be authenticated based on the captured fingerprint substantially matching (i.e., either exactly matching or matching within a predefined difference measurement range) the fingerprint of the control fingerprint image and the identification of the presence of the shadow 1006.

Keypad as a Fingerprint Scanner

The use of 4-digit PIN codes for authentication has fallen out of favor, replaced either by 6-8 digit PIN codes or by biometrics. A multi-factor approach could improve on the security of either PIN code approaches, while imposing a similar burden on the user as the original 4-digit PIN code, if full-screen fingerprint sensing is enabled. In such an approach, the user may be asked to key in a 4-digit PIN on a numeric keypad displayed on the display. For each key press, a fingerprint image could be taken. At least one of the fingerprint images could match the training image (i.e., control fingerprint image), in addition to keying in the correct PIN, to pass the authentication. An additional benefit of this approach is that 4 fingerprint images could be captured instead of one. This gives some flexibility for the authentication engine to either lower the false-rejection rate (FRR) by accepting any one of the four, or to lower the false-acceptance rate (FAR) by requiring all four prints to match. While, a 4-digit PIN code is described, it should be understood that there may be a different number of digits of the PIN code in other embodiments.

As an alternative to a numeric keypad, the user could be required to key in two numbers, letters or symbols simultaneously using two fingers—for example the two index fingers. In this way, the PIN and fingerprint images could all be captured simultaneously, rather than taking time to do 4 sequential images.

Figure 11:
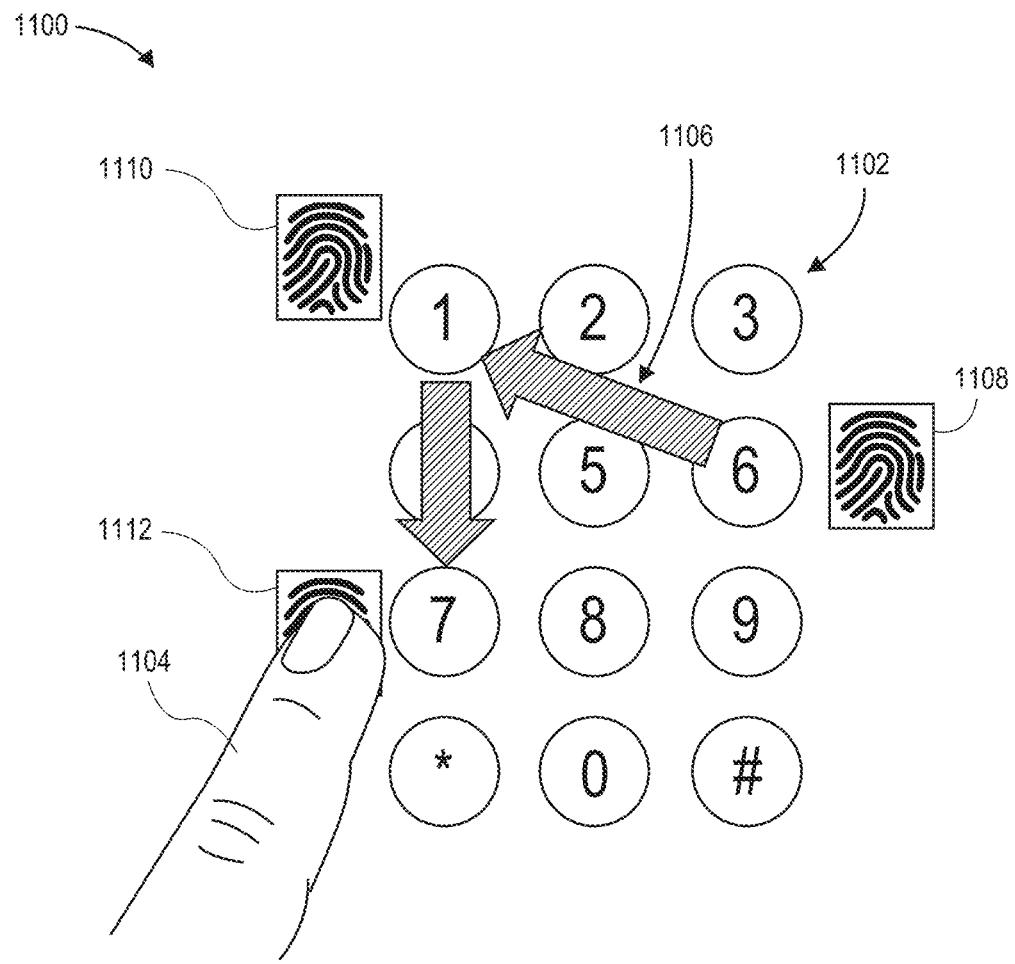
FIG. 11 illustrates an example numeric keypad capture arrangement, according to various embodiments disclosed herein.

FIG. 11 illustrates an example numeric keypad capture arrangement 1100, according to various embodiments disclosed herein. The numeric keypad capture arrangement 1100 may be utilized for authenticating a user based on a PIN entered by the user and fingerprint captures captured while the user is entering the PIN.

The example numeric keypad capture arrangement 1100 may include a keypad 1102, where the keypad 1102 may be displayed on a display. The keypad 1102 illustrated is a numeric keypad 1102, although it should be understood may comprise any other type of a keypad in other embodiments. The example numeric keypad capture arrangement 1100 may further include a finger 1104 of a user, where the finger 1104 may be placed on the display to select numbers from the keypad 1102. In the illustrated embodiment, finger 1104 may select of sequence of 6-1-7 from the keypad 1102, as indicated by arrows 1106. Fingerprint captures of a fingerprint of the finger 1104 may be captured as the finger 1104 selects one or more of the numbers in the sequence. For example, a first fingerprint capture 1108 is captured as the 6 is selected, a second fingerprint capture 1110 is captured as the 1 is selected, and a third fingerprint capture 1112 is captured as the 7 is selected. The fingerprint captures may be captured by the display emitting light and detecting light, of the light emitted, reflected back to the display to produce the fingerprint captures. Fingerprints captured in each of the first fingerprint capture 1108, the second fingerprint capture 1110, and the third fingerprint capture 1112 may be compared to a control fingerprint image, where the control fingerprint image may have been previously captured and stored as an authenticated fingerprint image corresponding to the user. Based on the comparison, a determination of whether any of the fingerprints captured in the fingerprint captures substantially match (i.e., either exactly match or match within a predefined difference measurement range) with a fingerprint of the control fingerprint image may be performed. Further, the sequence of numbers entered by the user may be compared with a control sequence, where the control sequence may have been previously entered and stored as an authenticated control sequence corresponding to the particular user. The user may be authenticated based on one or more of the fingerprints in the fingerprint capture substantially matching the fingerprint of the control fingerprint image and the sequence of numbers matching the control sequence.

System

Figure 12:
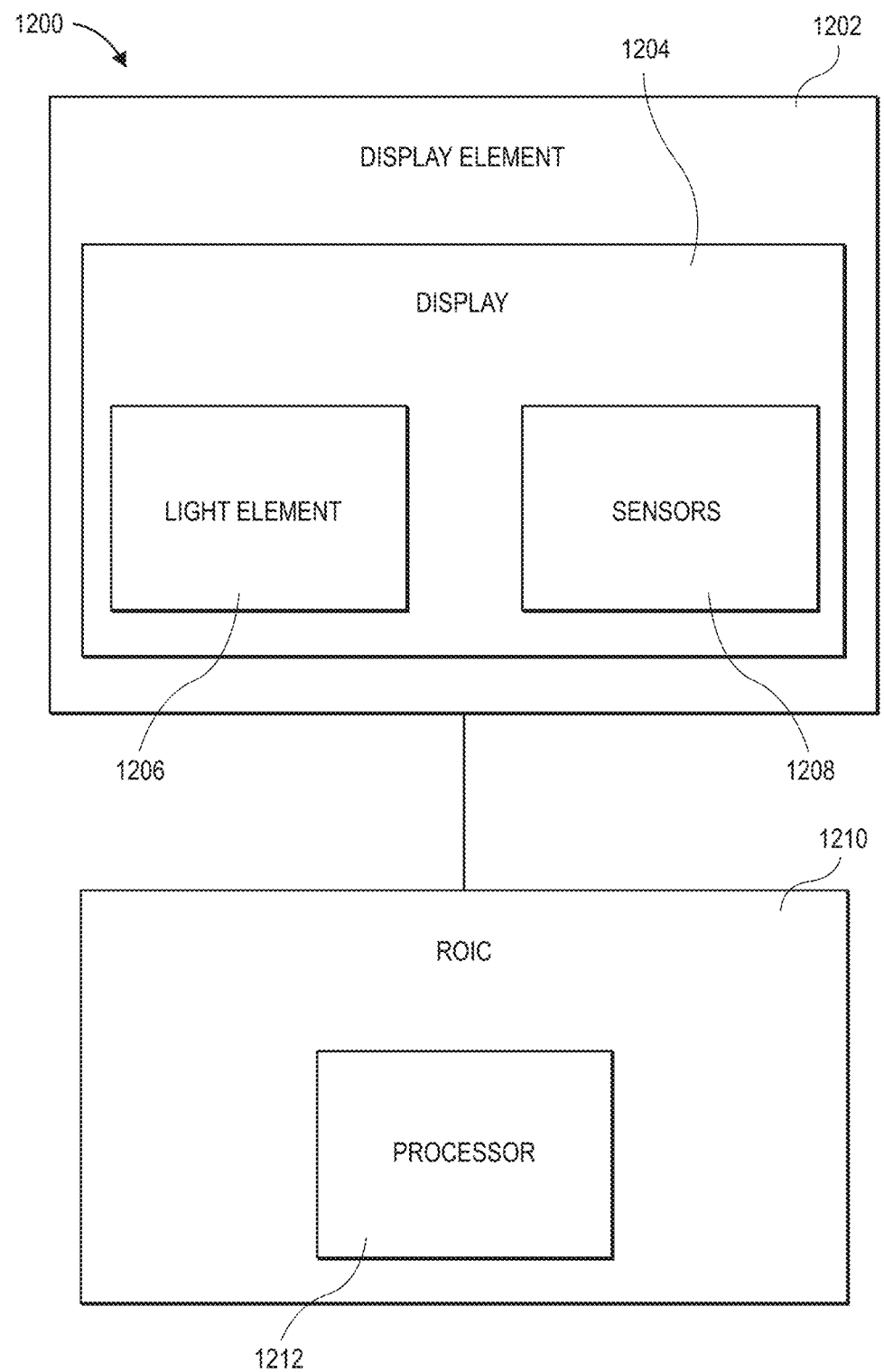
FIG. 12 illustrates an example system that may implement one or more of the approaches, captures, the capture arrangements, and/or procedures disclosed herein, according to various embodiments disclosed herein.

FIG. 12 illustrates an example system 1200 that may implement one or more of the approaches, captures, the capture arrangements, and/or procedures disclosed herein, according to various embodiments disclosed herein. In particular, the system 1200 may implement the fingerprint capture arrangement 100 (FIG. 1), the fingerprint capture arrangement 200 (FIG. 2), the fingerprint capture arrangement 300 (FIG. 3), the fingerprint capture arrangement 400 (FIG. 4), the procedure 500 (FIG. 5), the procedure 600 (FIG. 6), the multi-finger fingerprint capture arrangement 700 (FIG. 7), the action fingerprint capture arrangement 800 (FIG. 8), the touch sequence capture representation 900 (FIG. 9), the touch and background artifact capture arrangement 1000 (FIG. 1), and/or the numeric keypad capture arrangement 1100 (FIG. 11) in various embodiments.

The system 1200 may include a display element 1202. The display element 1202 may include any element that includes a display, such as a monitor, a touch screen, a laptop, a smart phone, a computer device, or some combination thereof.

The display element 1202 may include a display 1204. The display 1204 may include any electronic element that may produce and display visual displays, such as a screen. The display 1204 may include a light element 1206, where the light element 1206 may be located adjacent to the display 1204 and may light up the display to display visual displays on the display 1204. The light element 1206 may include one or more OLEDs, ELD elements, liquid crystal elements, LEDs, AMOLEDs, plasma elements, and/or QLEDs. The display 1204 may further include one or more sensors 1208, where the sensors 1208 may detect light directed at the display 1204, such as light reflected back from the light element 1206 and/or ambient light. The sensors 1208 may include one or more TFT sensors. The display 1204 may implement one or more of the approaches, capture arrangements, and/or procedures described as being implemented by a display throughout this disclosure in various embodiments.

The system 1200 may further include a readout integrated circuit (ROIC) 1210. The ROIC 1210 may be coupled to the display element 1202 and may communicate with the display element 1202. The ROIC 1210 may include a processor 1212. In some embodiments, the ROIC 1210 may further include other circuitry (such as conductors and/or electrical components) that may be utilized transmitting data and/or performing processes on data. The ROIC 1210, including the processor 1212, may perform one or more of the operations described herein, such as capturing and storing of fingerprint captures, performance of comparisons, performance of determinations, or some combination thereof. While the ROIC 1210 is separate from the display element 1202 in the illustrated embodiment, it should be that the ROIC 1210 may be included in the display element 1202 in other embodiments. For example, when the display element 1202 is a smart phone, the ROIC 1210 may be included in the display element 1202.

EXAMPLE IMPLEMENTATIONS

The following examples are provided by way of illustration.

Example 1 may include one or more computer-readable media having instructions stored thereon, wherein the instructions, when executed by a system, cause the system to emit a colored light to light a finger positioned on a display for fingerprint authentication, capture a fingerprint image of the finger produced based on the colored light, and compare the fingerprint image with a control fingerprint image to determine a result of the fingerprint authentication.

Example 2 may include the one or more computer-readable media of example 1, wherein the fingerprint image is monochromatic.

Example 3 may include the one or more computer-readable media of example 1, wherein the colored light is a first colored light in a sequence of colored lights, where in the fingerprint image is a first fingerprint image, wherein the instructions, when executed by the system, further cause the system to emit a second colored light in the sequence of colored lights to light the finger for fingerprint authentication, the second colored light to be emitted subsequent to the first colored light, capture a second fingerprint image of the finger produced based on the second colored light, and compare the second fingerprint image with the control fingerprint image to determine the result of the fingerprint authentication.

Example 4 may include the one or more computer-readably media of example 3, wherein the instructions, when executed by the system, further cause the system to emit a third colored light in the sequence of colored lights to light the finger for fingerprint authentication, the third colored light to be emitted subsequent to the second colored light, capture a third fingerprint image of the finger produced based on the third colored light, and compare the third fingerprint image with the control fingerprint image to determine the result of the fingerprint authentication.

Example 5 may include the one or more computer-readable media of example 4, wherein the first colored light is a first light of a red light, a green light, or a blue light, wherein the second colored light is a second light of the red light, the green light, or the blue light, and wherein the third colored light is a third light of the red light, the green light, or the blue light.

Example 6 may include the one or more computer-readable media of example 3, wherein the instructions, when executed by the system, further cause the system to compare the first fingerprint image with the second fingerprint image, and determine differences between the first fingerprint image and the second fingerprint image due to the first colored light and the second colored light, the differences to be determined based on the comparison of the first fingerprint image with the second fingerprint image, wherein the result of the fingerprint authentication is to be determined further based on the differences.

Example 7 may include the one or more computer-readable media of example 1, wherein the colored light is a first colored light, wherein the first colored light is to light a first region of the display on which the finger is positioned to light a first portion of the finger, wherein the instructions, when executed by the system, further cause the system to emit a second colored light to light a second region of the display on which the finger is positioned to light a second portion of the finger, wherein the fingerprint image is produced based on both the first colored light and the second colored light, and wherein the control fingerprint image was generated based on a capture with the first colored light and the second colored light.

Example 8 may include the one or more computer-readable media of example 7, wherein the instructions, when executed by the system, further cause the system to emit a third colored light to light a third region of the display on which the finger is positioned to light a third portion of the finger, wherein the fingerprint image is produced based on the first colored light, the second colored light, and the third colored light, and capture for generation of the control fingerprint image further has the third colored light.

Example 9 may include the one or more computer-readable media of example 8, wherein the first colored light is a first light of a red light, a green light, or a blue light, wherein the second colored light is a second light of the red light, the green light, or the blue light, and wherein the third colored light is a third light of the red light, the green light, or the blue light.

Example 10 may include the one or more computer-readable media of example 1, wherein the instructions, when executed by the system, further cause the system to capture a training image using the colored light, determine a quality rating of the training image, and determine to utilize the colored light for the fingerprint authentication based on the quality rating of the training image.

Example 11 may include the one or more computer-readable media of example 10, wherein the colored light is a first colored light, wherein the training image is a first training image, wherein the instructions, when executed by the system, further cause the system to capture a second training image using a second colored light, determine a quality rating of the second training image, and compare the quality rating of the first training image with the quality rating of the second training image, wherein the first colored light is to be determined based on the comparison of the quality rating of the first training image with the quality rating of the second training image.

Example 12 may include the one or more computer-readable media of example 10, wherein the quality rating of the training image is to be determined based on a contrast of the training image.

Example 13 may include a method for fingerprint authentication, comprising sensing a finger positioned on a display, applying a colored light to the finger, capturing a fingerprint image based on the colored light reflected from the finger, and comparing the fingerprint image with a control fingerprint image to authenticate the finger.

Example 14 may include the method of example 13, wherein capturing the fingerprint image includes detecting specific colors of light reflected from the finger to produce the fingerprint image.

Example 15 may include the method of example 13, wherein the colored light is a first colored light, wherein the fingerprint image is a first fingerprint image, wherein the method further comprises applying a second colored light to the finger subsequent to applying the first colored light, capturing a second fingerprint image based on the second colored light reflected from the finger, the second fingerprint image captured subsequent to the first fingerprint image, and comparing the second fingerprint image with the control fingerprint image to further authenticate the finger.

Example 16 may include the method of example 15, further comprising identifying differences between the first fingerprint image and the second fingerprint image, and utilizing the identified differences to further authenticate the finger.

Example 17 may include the method of example 13, wherein the colored light is a first colored light, wherein applying the first colored light to the finger includes emitting the first colored light from a first region corresponding to the finger, wherein the method further comprises emitting a second colored light from a second region corresponding to the finger, wherein the fingerprint image is captured further on the second colored light reflected from the finger.

Example 18 may include the method of example 17, wherein the first region comprises a first rectangle corresponding to the finger, wherein the second region comprises a second rectangle corresponding to the finger, and wherein the second rectangle is adjacent to the first rectangle.

Example 19 may include a system to perform fingerprint authentication, comprising a display on which a finger is to be positioned for the fingerprint authentication, a light element to emit a colored light out of the display on the finger, one or more sensors to detect the colored light reflected toward the display by the finger, and a readout integrated circuit (ROIC) to generate a fingerprint image based of the reflected colored light detected by the one or more sensors, and determine whether to authenticate the finger based on a comparison of the fingerprint image with a control fingerprint image.

Example 20 may include the system of example 19, wherein the colored light is a first colored light, wherein the fingerprint image is a first fingerprint image, and wherein the light element is to emit a second colored light out of the display on the finger, wherein the second colored light is to be emitted subsequent to the first colored light being emitted, the one or more sensors are to detect the second colored light reflected toward the display by the finger, and the ROIC is to generate a second fingerprint image based on the reflected second colored light detected by the one or more sensors, wherein to determine whether to authenticate the finger is further based on a comparison of the second fingerprint image with the control fingerprint image.

Example 21 may include a method for fingerprint authentication, comprising detecting a finger being positioned on a display, capturing a first fingerprint image of the finger in response to the detection of the finger being positioned on the display, capturing a second fingerprint image of the finger, the second fingerprint image captured subsequent to the first fingerprint image, determining whether a first portion of the finger represented by the first fingerprint image is different from a second portion of the finger represented by the second fingerprint image, and determining whether to authenticate the finger based on whether the first portion of the finger represented by the first fingerprint image is different from the second portion of the finger represented by the second fingerprint image.

Example 22 may include the method of example 21, wherein determining whether to authenticate the finger includes determining to authenticate the finger based on the first portion of the finger represented by the first fingerprint image being determined to be different from the second portion of the finger represented by the second fingerprint image.

Example 23 may include the method of example 21, wherein determining whether to authenticate the finger includes determining to authenticate the finger based on the second portion of the finger represented by the second fingerprint image including a greater portion of the finger than the first portion of the finger represented by the first fingerprint image.

Example 24 may include the method of example 21, wherein determining whether to authenticate the finger includes determining to authenticate the finger based on the second portion of the finger represented by the second fingerprint image including a smaller portion of the finger than the first portion of the finger represented by the first fingerprint image.

Example 25 may include the method of example 21, further comprising capturing a third fingerprint image of the finger, the third fingerprint image captured subsequent to the second fingerprint image, and determining whether a third portion of the finger represented by the third fingerprint image is different from the second portion of the finger represented by the second fingerprint image, wherein determining whether to authenticate the finger is further based on whether the third portion of the finger represented by the third fingerprint image is different from the second portion of the finger represented by the second fingerprint image.

Example 26 may include the method of example 25, wherein determining whether to authenticate the finger includes determining to authenticate the finger based on the second portion of the finger represented by the second fingerprint image including a greater portion of the finger than the first portion of the finger represented by the first fingerprint image and the third portion of the finger represented by the third fingerprint image including a smaller portion of the finger than the second portion of the finger represented by the second fingerprint image.

Example 27 may include the method of example 21, further comprising identifying a third portion of the finger that is a difference between the between the first portion of the finger represented by the first fingerprint image and the second portion of the finger represented by the second fingerprint image, and determining whether the third portion of the finger is contiguous with the first portion of the finger or the second portion of the finger, wherein determining whether to authenticate the finger if further based on whether the third portion of the finger is contiguous with the first portion of the finger or the second portion of the finger.

Example 28 may include one or more computer-readable media having instructions stored thereon, wherein the instructions, when executed by a system, cause the system to perform the method of any of the examples 21-27.

Example 29 may include a system that performs the method of any of the examples 21-27, wherein the system may include one or more of a display, a light element, one or more sensors, or a readout integrated circuit.

Example 30 may include a method for fingerprint authentication, comprising detecting a position of a finger positioned against a display, determining whether a shadow is cast on the display adjacent to the position, and determining whether to authenticate the finger based on whether the shadow is cast on the display adjacent to the position.

Example 31 may include the method of example 30, wherein determining whether the shadow is cast on the display includes determining whether an amount of ambient light detected in an area of the display adjacent to the position is less than an amount of ambient light detected in a different area of the display.

Example 32 may include the method of example 30, further comprising capturing a fingerprint image of the finger, and comparing the fingerprint image with a control fingerprint image, wherein determining whether to authenticate the finger is further based on the comparison of the fingerprint image with the control fingerprint image.

Example 33 may include one or more computer-readable media having instructions stored thereon, wherein the instructions, when executed by a system, cause the system to perform the method of any of the examples 30-32.

Example 34 may include a system that performs the method of any of the examples 30-32, wherein the system may include one or more of a display, a light element, one or more sensors, or a readout integrated circuit.

The foregoing outlines features of one or more embodiments of the subject matter disclosed herein. These embodiments are provided to enable a person having ordinary skill in the art (PHOSITA) to better understand various aspects of the present disclosure. Certain well-understood terms, as well as underlying technologies and/or standards may be referenced without being described in detail. It is anticipated that the PHOSITA will possess or have access to background knowledge or information in those technologies and standards sufficient to practice the teachings of the present specification.

The PHOSITA will appreciate that they may readily use the present disclosure as a basis for designing or modifying other processes, structures, or variations for carrying out the same purposes and/or achieving the same advantages of the embodiments introduced herein. The PHOSITA will also recognize that such equivalent constructions do not depart from the spirit and scope of the present disclosure, and that they may make various changes, substitutions, and alterations herein without departing from the spirit and scope of the present disclosure.

Note that the activities discussed above with reference to the FIGURES are applicable to any integrated circuit that involves capture of fingerprint images and verification based on the fingerprint images, particularly those that can execute specialized software programs or algorithms, some of which may be associated with processing digitized real-time data. Certain embodiments can relate to multi-DSP, multi-ASIC, or multi-SoC signal processing, floating point processing, signal/control processing, fixed-function processing, microcontroller applications, etc.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

The particular embodiments of the present disclosure may readily include a system on chip (SoC) central processing unit (CPU) package. An SoC represents an integrated circuit (IC) that integrates components of a computer or other electronic system into a single chip. It may contain digital, analog, mixed-signal, and radio frequency functions: all of which may be provided on a single chip substrate. Other embodiments may include a multi-chip-module (MCM), with a plurality of chips located within a single electronic package and configured to interact closely with each other through the electronic package. Any module, function, or block element of an ASIC or SoC can be provided, where appropriate, in a reusable "black box" intellectual property (IP) block, which can be distributed separately without disclosing the logical details of the IP block. In various other embodiments, the digital signal processing functionalities may be implemented in one or more silicon cores in application-specific integrated circuits (ASICs), field-programmable gate arrays (FPGAs), and other semiconductor chips.

In some cases, the teachings of the present specification may be encoded into one or more tangible, non-transitory computer-readable mediums having stored thereon executable instructions that, when executed, instruct a programmable device (such as a processor or DSP) to perform the methods or functions disclosed herein. In cases where the teachings herein are embodied at least partly in a hardware device (such as an ASIC, IP block, or SoC), a non-transitory medium could include a hardware device hardware-programmed with logic to perform the methods or functions disclosed herein. The teachings could also be practiced in the form of Register Transfer Level (RTL) or other hardware description language such as VHDL or Verilog, which can be used to program a fabrication process to produce the hardware elements disclosed.

In example implementations, at least some portions of the processing activities outlined herein may also be implemented in software. In some embodiments, one or more of these features may be implemented in hardware provided external to the elements of the disclosed figures, or consolidated in any appropriate manner to achieve the intended functionality. The various components may include software (or reciprocating software) that can coordinate in order to achieve the operations as outlined herein. In still other embodiments, these elements may include any suitable algorithms, hardware, software, components, modules, interfaces, or objects that facilitate the operations thereof.

Additionally, some of the components associated with described microprocessors may be removed, or otherwise consolidated. In a general sense, the arrangements depicted in the figures may be more logical in their representations, whereas a physical architecture may include various permutations, combinations, and/or hybrids of these elements. It is imperative to note that countless possible design configurations can be used to achieve the operational objectives outlined herein. Accordingly, the associated infrastructure has a myriad of substitute arrangements, design choices, device possibilities, hardware configurations, software implementations, equipment options, etc.

Any suitably-configured processor component can execute any type of instructions associated with the data to achieve the operations detailed herein. Any processor disclosed herein could transform an element or an article (for example, data) from one state or thing to another state or thing. In another example, some activities outlined herein may be implemented with fixed logic or programmable logic (for example, software and/or computer instructions executed by a processor) and the elements identified herein could be some type of a programmable processor, programmable digital logic (for example, an FPGA, an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof. In operation, processors may store information in any suitable type of non-transitory storage medium (for example, random access memory (RAM), read only memory (ROM), FPGA, EPROM, electrically erasable programmable ROM (EEPROM), etc.), software, hardware, or in any other suitable component, device, element, or object where appropriate and based on particular needs. Further, the information being tracked, sent, received, or stored in a processor could be provided in any database, register, table, cache, queue, control list, or storage structure, based on particular needs and implementations, all of which could be referenced in any suitable timeframe. Any of the memory items discussed herein should be construed as being encompassed within the broad term 'memory.' Similarly, any of the potential processing elements, modules, and machines described herein should be construed as being encompassed within the broad term 'microprocessor' or 'processor.' Furthermore, in various embodiments, the processors, memories, network cards, buses, storage devices, related peripherals, and other hardware elements described herein may be realized by a processor, memory, and other related devices configured by software or firmware to emulate or virtualize the functions of those hardware elements.

Computer program logic implementing all or part of the functionality described herein is embodied in various forms, including, but in no way limited to, a source code form, a computer executable form, a hardware description form, and various intermediate forms (for example, mask works, or forms generated by an assembler, compiler, linker, or locator). In an example, source code includes a series of computer program instructions implemented in various programming languages, such as an object code, an assembly language, or a high-level language such as OpenCL, RTL, Verilog, VHDL, Fortran, C, C++, JAVA, or HTML for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

In one example embodiment, any number of electrical circuits of the FIGURES may be implemented on a board of an associated electronic device. The board can be a general circuit board that can hold various components of the internal electronic system of the electronic device and, further, provide connectors for other peripherals. More specifically, the board can provide the electrical connections by which the other components of the system can communicate electrically. Any suitable processors (inclusive of digital signal processors, microprocessors, supporting chipsets, etc.), memory elements, etc. can be suitably coupled to the board based on particular configuration needs, processing demands, computer designs, etc. Other components such as external storage, additional sensors, controllers for audio/video display, and peripheral devices may be attached to the board as plug-in cards, via cables, or integrated into the board itself. In another example embodiment, the electrical circuits of the FIGURES may be implemented as standalone modules (e.g., a device with associated components and circuitry configured to perform a specific application or function) or implemented as plug-in modules into application-specific hardware of electronic devices.

Note that with the numerous examples provided herein, interaction may be described in terms of two, three, four, or more electrical components. However, this has been done for purposes of clarity and example only. It should be appreciated that the system can be consolidated in any suitable manner. Along similar design alternatives, any of the illustrated components, modules, and elements of the FIGURES may be combined in various possible configurations, all of which are clearly within the broad scope of this specification. In certain cases, it may be easier to describe one or more of the functionalities of a given set of flows by only referencing a limited number of electrical elements. It should be appreciated that the electrical circuits of the FIGURES and its teachings are readily scalable and can accommodate a large number of components, as well as more complicated/sophisticated arrangements and configurations. Accordingly, the examples provided should not limit the scope or inhibit the broad teachings of the electrical circuits as potentially applied to a myriad of other architectures.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke 35 U.S.C. § 112(f) as it exists on the date of the filing hereof unless the words "means for" or "steps for" are specifically used in the particular claims; and (b) does not intend, by any statement in the specification, to limit this disclosure in any way that is not otherwise reflected in the appended claims.

What is claimed is:

1. One or more non-transitory computer-readable media having instructions stored thereon, wherein the instructions, when executed by a system, cause the system to:
   emit a colored light to light a finger positioned on a display for fingerprint authentication, wherein the colored light is a first colored light in a sequence of colored lights;
   capture a first fingerprint image of the finger produced based on the colored light;
   compare the first fingerprint image with a control fingerprint image to determine a result of the fingerprint authentication;
   emit a second colored light in the sequence of colored lights to light the finger for fingerprint authentication, the second colored light to be emitted subsequent to the first colored light;
   capture a second fingerprint image of the finger produced based on the second colored light;
   compare the second fingerprint image with the control fingerprint image to determine the result of the fingerprint authentication;
   emit a third colored light in the sequence of colored lights to light the finger for fingerprint authentication, the third colored light to be emitted subsequent to the second colored light;
   capture a third fingerprint image of the finger produced based on the third colored light; and
   compare the third fingerprint image with the control fingerprint image to determine the result of the fingerprint authentication.

2. The one or more non-transitory computer-readable media of claim 1, wherein the first fingerprint image is monochromatic.

3. The one or more non-transitory computer-readable media of claim 1, wherein the first colored light is a first light of a red light, a green light, or a blue light, wherein the second colored light is a second light of the red light, the green light, or the blue light, and wherein the third colored light is a third light of the red light, the green light, or the blue light.

4. The one or more non-transitory computer-readable media of claim 1, wherein the instructions, when executed by the system, further cause the system to:
   capture a training image using the colored light;
   determine a quality rating of the training image; and
   determine to utilize the colored light for the fingerprint authentication based on the quality rating of the training image.

5. The one or more non-transitory computer-readable media of claim 4, wherein the colored light is a first colored light, wherein the training image is a first training image, wherein the instructions, when executed by the system, further cause the system to:

capture a second training image using a second colored light;

determine a quality rating of the second training image; and compare the quality rating of the first training image with the quality rating of the second training image, wherein the first colored light is to be determined based on the comparison of the quality rating of the first training image with the quality rating of the second training image.

6. The one or more non-transitory computer-readable media of claim 4, wherein the quality rating of the training image is to be determined based on a contrast of the training image.

7. The one or more non-transitory computer-readable media of claim 1, wherein at least one of the first fingerprint image, the second fingerprint image, or the third fingerprint image is captured based on a detection of one or more specific colors of light reflected from the finger.

8. One or more non-transitory computer-readable media having instructions stored thereon, wherein the instructions, when executed by a system, cause the system to:

emit a colored light to light a finger positioned on a display for fingerprint authentication, wherein the colored light is a first colored light in a sequence of colored lights;

capture a first fingerprint image of the finger produced based on the colored light;

compare the first fingerprint image with a control fingerprint image to determine a result of the fingerprint authentication;

emit a second colored light in the sequence of colored lights to light the finger for fingerprint authentication, the second colored light to be emitted subsequent to the first colored light;

capture a second fingerprint image of the finger produced based on the second colored light;

compare the second fingerprint image with the control fingerprint image to determine the result of the fingerprint authentication;

compare the first fingerprint image with the second fingerprint image; and determine differences between the first fingerprint image and the second fingerprint image due to the first colored light and the second colored light, the differences to be determined based on the comparison of the first fingerprint image with the second fingerprint image, wherein the result of the fingerprint authentication is to be determined further based on the differences.

9. The one or more non-transitory computer-readable media of claim 8, wherein at least one of the first fingerprint image or the second fingerprint image is monochromatic.

10. The one or more non-transitory computer-readable media of claim 8, wherein at least one of the first fingerprint image or the second fingerprint image is captured based on a detection of one or more specific colors of light reflected from the finger.

11. One or more non-transitory computer-readable media having instructions stored thereon, wherein the instructions, when executed by a system, cause the system to:

emit a colored light to light a finger positioned on a display for fingerprint authentication, wherein the colored light is a first colored light, wherein the first colored light is to light a first region of the display on which the finger is positioned to light a first portion of the finger;

emit a second colored light to light a second region of the display on which the finger is positioned to light a second portion of the finger;

capture a fingerprint image of the finger produced based on both the first colored light and the second colored light; and compare the fingerprint image with a control fingerprint image to determine a result of the fingerprint authentication, wherein the control fingerprint image was generated based on a capture with the first colored light and the second colored light.

12. The one or more non-transitory computer-readable media of claim 11, wherein the instructions, when executed by the system, further cause the system to:

emit a third colored light to light a third region of the display on which the finger is positioned to light a third portion of the finger, wherein the fingerprint image is produced based on the first colored light, the second colored light, and the third colored light, and capture for generation of the control fingerprint image further has the third colored light.

13. The one or more non-transitory computer-readable media of claim 12, wherein the first colored light is a first light of a red light, a green light, or a blue light, wherein the second colored light is a second light of the red light, the green light, or the blue light, and wherein the third colored light is a third light of the red light, the green light, or the blue light.

14. A method for fingerprint authentication, comprising:

sensing, using one or more sensors, a finger positioned on a display;

applying, using a light element, a colored light to the finger;

generating, using a readout integrated circuit (ROIC), a fingerprint image based on the colored light reflected from the finger, wherein the generating the fingerprint image includes detecting one or more specific colors of light reflected from the finger to produce the fingerprint image; and comparing, using the ROIC, the fingerprint image with a control fingerprint image to authenticate the finger.

15. The method of claim 14, wherein the colored light is a first colored light, wherein the fingerprint image is a first fingerprint image, wherein the method further comprises:

applying a second colored light to the finger subsequent to applying the first colored light;

capturing a second fingerprint image based on the second colored light reflected from the finger, the second fingerprint image captured subsequent to the first fingerprint image; and comparing the second fingerprint image with the control fingerprint image to further authenticate the finger.

16. The method of claim 15, further comprising:

identifying differences between the first fingerprint image and the second fingerprint image; and utilizing the identified differences to further authenticate the finger.

17. The method of claim 14, wherein the colored light is a first colored light, wherein applying the first colored light to the finger includes emitting the first colored light from a first region corresponding to the finger, wherein the method further comprises:

emitting a second colored light from a second region corresponding to the finger, wherein the fingerprint image is captured further on the second colored light reflected from the finger.

18. The method of claim 17, wherein the first region comprises a first rectangle corresponding to the finger, wherein the second region comprises a second rectangle corresponding to the finger, and wherein the second rectangle is adjacent to the first rectangle.

19. A system to perform fingerprint authentication, comprising:
   a display on which a finger is to be positioned for the fingerprint authentication;
   a light element to emit a colored light out of the display on the finger;
   one or more sensors to detect the colored light reflected toward the display by the finger; and
   a readout integrated circuit (ROIC) to:
      generate a fingerprint image based on a detection of one or more specific colors of light reflected from the finger and detected by the one or more sensors; and
      determine whether to authenticate the finger based on a comparison of the fingerprint image with a control fingerprint image.

20. The system of claim 19, wherein the colored light is a first colored light, wherein the fingerprint image is a first fingerprint image, and wherein:
   the light element is to emit a second colored light out of the display on the finger, wherein the second colored light is to be emitted subsequent to the first colored light being emitted;
   the one or more sensors are to detect the second colored light reflected toward the display by the finger; and
   the ROIC is to generate a second fingerprint image based on the reflected second colored light detected by the one or more sensors, wherein to determine whether to authenticate the finger is further based on a comparison of the second fingerprint image with the control fingerprint image.

21. The system of claim 20, wherein the light element is to emit a third colored light out of the display on the finger, wherein the third colored light is to be emitted subsequent to the second colored light being emitted;
   the one or more sensors are to detect the third colored light reflected toward the display by the finger; and
   the ROIC is to generate a third fingerprint image based on the reflected third colored light detected by the one or more sensors, wherein to determine whether to authenticate the finger is further based on a comparison of the third fingerprint image with the control fingerprint image.

\* \* \* \* \*